Patented June 9, 1931

1,809,799

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

ANTIOXIDANT OR AGE-RESISTER

No Drawing.   Application filed January 16, 1930.  Serial No. 421,261.

This invention relates to the manufacture of rubber compounds, and it has particular relation to the manufacture of compounds which offer an exceptionally high degree of resistance to the action of such agencies as oxygen and light, which normally cause premature aging and decay thereof.

An object of the invention is to provide a novel method of manufacturing age-resisting rubber compounds which involves the use of abundant and relatively inexpensive materials for which there is but little use at the present time.

Heretofore, in the industries much loss has been occasioned because of premature decay of rubber goods under the action of air and sunlight. In order to reduce these losses, it has been proposed to introduce certain compounds, such as hydroquinone, diphenylamine and certain aldehyde aromatic amine reaction products, known as antioxidants, into the rubber either by superficial application after vulcanization or by direct intermixture therewith during the process of milling the rubber prior to vulcanization. Although many of the compounds heretofore proposed have been found to be comparatively satisfactory as oxidation inhibitors, the use thereof, in some cases, is impracticable because of the relatively expensive character of the ingredients from which they are prepared.

This invention consists in the discovery that acenaphthene, a compound having the formula

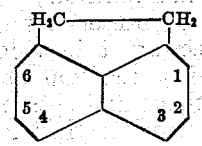

and derivatives, constitute excellent antioxidants or age-retarders when incorporated into rubber goods. The following are a few of the compounds of this class which are effective for this purpose: 3-amino acenaphthene; 3-beta-naphthyl amido acenaphthene; 3-alpha naphthyl amino acenaphthene; 3-hydroxy acenaphthene; diamino acenaphthene; such aldehyde derivatives of 3-amino acenaphthene as the following: formaldehyde, acetaldehyde, butyraldehyde and crotonaldehyde; symmetrical ethylene di-acenaphthene; 2-4-diamino phenyl 3-amino acenaphthene; 3-formyl amino acenaphthene; and di-acenaphthene amine.

The 3-amino acenaphthene compound, which at the present time is one of the most practicable members of the series from a commercial standpoint, may conveniently be prepared by reducing three nitro acenaphthene by any convenient method, for example, by the use of iron filings and dilute hydrochloric acid. Such reductions are well known to chemists and need not be discussed in detail.

In the preparation of 3-beta naphthyl amino acenaphthene, 3-amino acenaphthene is intermixed in molar ratio with beta naphthol and subjected to heat and pressure in an autoclave. The latter treatment should be continued for a period of approximately 6 to 8 hours and at a temperature ranging from 260° to 290° C. The resultant product is obtained as a somewhat pasty mass by washing the crude material as it is obtained from the autoclave with a dilute solution of sodium hydroxide which removes most of the free or unreacted naphthol. Purification may be rendered somewhat more complete by further washing the partially purified material with hot water. A similar method may be employed for the preparation of the alpha naphthyl amine compound, the only difference being in the substitution of alpha-naphthol for beta-naphthol. However, under present conditions the alpha compound is less practicable from a commercial standpoint because of the relatively expensive character of alpha naphthol.

Although the antioxidants discussed may be employed in substantially any of the standard rubber formulæ, the following is an example of such formula in which they have been found to be particularly effective.

| | Parts |
|---|---|
| Acetone extracted rubber | 100 |
| Zinc oxide | 5 |
| Sulphur | 3 |
| Stearic acid | 1.5 |
| Hexamethylene tetramine | 1 |
| Antioxidant | 1 |

Duplicate sets of samples of rubber prepared in accordance with the preceding formula in which 3-amino acenaphthene and 3-beta-naphthyl amido acenaphthene were employed as antioxidants, were subjected to vulcanization for varying periods of time. One set of these samples was then subjected to physical tests in order to ascertain their tensile strength and elasticity prior to aging. A second set was first weighed in order to ascertain the original weight thereof, after which they were placed in an oxygen bomb and subjected to the action of oxygen under a pressure of 150 pounds per square inch and at a temperature of 50° C. for a period of six days. The samples were then weighed a second time in order to ascertain the percentage of oxygen absorbed, after which they were subjected to the same physical tests conducted upon the unaged samples. The results of these tests are tabulated as follows:

| Cure | | Load in kgs/cm² at | | | % elong. at break | Percent weight increase |
|---|---|---|---|---|---|---|
| Time in mins. | Temperature °F. | 500% elong. | 700% elong. | Break | | |
| *3-amino acenaphthene* | | | | | | |
| 35 | 285 | 18 | 52 | 129 | 865 | |
| 50 | 285 | 24 | 83 | 141 | 790 | |
| 70 | 285 | 33 | 130 | 172 | 750 | |
| AGED | | | | | | |
| 35 | 285 | 22 | 78 | 138 | 800 | .11 |
| 50 | 285 | 30 | 112 | 156 | 760 | .18 |
| 70 | 285 | 42 | 160 | 176 | 720 | .22 |
| *3-beta-naphthylamido acenaphthene* | | | | | | |
| ORIGINAL | | | | | | |
| 35 | 285 | 10 | 27 | 86 | 915 | |
| 50 | 285 | 13 | 43 | 121 | 860 | |
| 70 | 285 | 19 | 64 | 126 | 815 | |
| AGED | | | | | | |
| 35 | 285 | 13 | 38 | 92 | 870 | .00 |
| 50 | 285 | 18 | 60 | 108 | 805 | .12 |
| 70 | 285 | 23 | 83 | 124 | 770 | .13 |

From the results of these tests, it is apparent that samples of rubber which have been cured in the presence of either 3-amino acenaphthene or 3-beta naphthylamido acenaphthene resist, to a remarkable degree, the action of oxygen even under the relatively severe conditions existing in the above test.

Under similar conditions, samples identical with those described above, except for the omission of any antioxidant are reduced to resinous masses substantially devoid of elasticity and tensile strength and worthless for all practical purposes.

The compounds are not only desirable because of the high antioxidant properties possessed thereby, but also because they may be prepared from acenaphthene, a coal tar by-product for which there is but little or no market at the present time and which may therefore be obtained in abundance and at slight expense. Transformation of the original or basic materials to the desired amino derivatives may be accomplished with comparative ease. Accordingly, the cost of the antioxidants is relatively slight as compared with that of many materials now offered on the market. The materials are also practically odorless and non-toxic, and for that reason, their use in rubber compounds does not entail any unusual precautions in the handling thereof.

Although I have described in detail only the preferred forms of the invention, it will be apparent to those skilled in the art that it is not so limited, but that various modifications may be made therein without departing from the spirit of the invention or from the scope of the appended claims.

What I claim is:

1. A method of preserving rubber which comprises subjecting it to vulcanization in the presence of an amino derivative of acenaphthene.

2. A method of preserving rubber which comprises subjecting it to vulcanization in the presence of 3-amino acenaphthene.

3. A method of preserving rubber which comprises subjecting it to vulcanization in the presence of 3-beta-naphthylamido acenaphthene.

4. A method of preserving rubber which comprises subjecting it to vulcanization in the presence of a pre-amino derivative of acenaphthene.

5. A method of preserving rubber which comprises subjecting it to vulcanization in the presence of a reaction product of 3-amino-acenaphthene and naphthol.

6. A method of preserving rubber which comprises subjecting it to vulcanization in the presence of a reaction product of 3-amino acenaphthene and beta-naphthol.

7. A rubber product that has been vulcanized in the presence of an amino derivative of acenaphthene.

8. A rubber product that has been vulcanized in the presence of a 3-amino of acenaphthene.

9. A rubber product that has been vulcanized in the presence of 3-amino acenaphthene.

10. A rubber product that has been vulcanized in the presence of a napthol derivative of 3-amino acenaphthene.

11. As a new material, 3-beta-naphthylamino acenaphthene.

12. A method of preserving rubber which comprises subjecting it to vulcanization in the presence of a material having the formula

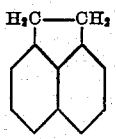

R, where R is attached to the naphthalene nucleus and is selected from the group consisting of hydrogen,—OH amino, hydrocarbon substituted amino groups naphthylamine groups, and residues obtained by condensing amino acenaphthene with an open chain aldehyde.

13. A method of preserving rubber which comprises subjecting it to cure in the presence of a material including the following group:

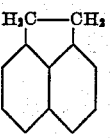

14. A rubber product that has been vulcanized in the presence of a material including the following group:

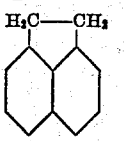

In witness whereof, I have hereunto signed my name.

Signed at Akron, in the county of Summit and State of Ohio, U. S. A., this 14th day of January, 1930.

ALBERT M. CLIFFORD.

Certificate of Correction

Patent No. 1,809,799.  Granted June 9, 1931, to

ALBERT M. CLIFFORD

It is hereby certified that error appears in the printed specification of the above-numbered patent requiring correction as follows: Page 2, line 115, claim 4, for the compound word " pre-amino " read *3-amino;* page 3, between lines 11 to 15, claim 12, strike out the formula and insert instead

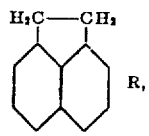

same claim, line 16, strike out the letter and comma " R,"; line 18, after the character —OH insert a comma, and line 19, insert a comma after " groups "; and that the said Letters Patent should be read with these corrections therein that the same may conform to the record of the case in the Patent Office.

Signed and sealed this 12th day of October, A. D. 1931.

[SEAL.]

M. J. MOORE,
*Acting Commissioner of Patents.*